United States Patent
Shinzawa et al.

(10) Patent No.: US 10,933,700 B2
(45) Date of Patent: Mar. 2, 2021

(54) PNEUMATIC TIRE

(71) Applicant: The Yokohama Rubber Co., LTD., Tokyo (JP)

(72) Inventors: Tatsuro Shinzawa, Hiratsuka (JP); Takashi Hoshiba, Hiratsuka (JP); Masahiro Naruse, Hiratsuka (JP)

(73) Assignee: The Yokohama Rubber Co., LTD.

( * ) Notice: Subject to any disclaimer, the term of this patent is extended or adjusted under 35 U.S.C. 154(b) by 280 days.

(21) Appl. No.: 15/771,859

(22) PCT Filed: Oct. 17, 2016

(86) PCT No.: PCT/JP2016/080689
§ 371 (c)(1),
(2) Date: Apr. 27, 2018

(87) PCT Pub. No.: WO2017/073391
PCT Pub. Date: May 4, 2017

(65) Prior Publication Data
US 2018/0326798 A1 Nov. 15, 2018

(30) Foreign Application Priority Data
Oct. 28, 2015 (JP) .............................. JP2015-211457

(51) Int. Cl.
*B60C 19/00* (2006.01)
*B60C 5/00* (2006.01)
(52) U.S. Cl.
CPC .............. *B60C 19/002* (2013.01); *B60C 5/00* (2013.01)

(58) Field of Classification Search
CPC ................................ B60C 19/002; B60C 5/00
See application file for complete search history.

(56) References Cited

U.S. PATENT DOCUMENTS

2006/0231185 A1 10/2006 Tanno
2007/0017619 A1* 1/2007 Yukawa ................ B60C 19/002
152/450

(Continued)

FOREIGN PATENT DOCUMENTS

DE 198 06 935 9/1999
JP 2006-044435 2/2006

(Continued)

OTHER PUBLICATIONS

International Search Report for International Application No. PCT/JP2016/080689 dated Jan. 17, 2017, 4 pages, Japan.

*Primary Examiner* — Jacob T Minskey
*Assistant Examiner* — Virak Nguon
(74) *Attorney, Agent, or Firm* — Thorpe North & Western

(57) ABSTRACT

A pneumatic tire includes a band-like sound absorbing member adhered on an inner surface of a tread portion along the tire circumferential direction. Cuts are formed on the band-like sound absorbing member mutually intersecting such that angles θ1, θ2 with regard to the tire width direction are within a range where 0°≤θ1≤90° or 0°≤θ2≤90°. The cuts are locally disposed in a region adjacent to an end portion on a vehicle inner side of the band-like sound absorbing member. A width of the placement region of the cuts is from 10% to 80% with regard to a width of the band-like sound absorbing member.

12 Claims, 5 Drawing Sheets

(56) References Cited

U.S. PATENT DOCUMENTS

| | | | |
|---|---|---|---|
| 2007/0131328 A1* | 6/2007 | Yukawa | B60C 19/002 |
| | | | 152/450 |
| 2008/0073016 A1 | 3/2008 | Tanno et al. | |
| 2008/0116612 A1* | 5/2008 | Dautrey | B60C 19/002 |
| | | | 264/316 |
| 2009/0277549 A1 | 11/2009 | Tanno | |
| 2011/0220264 A1* | 9/2011 | Nagai | B29D 30/0654 |
| | | | 152/548 |
| 2016/0135975 A1 | 5/2016 | Shimoyama | |
| 2016/0339749 A1* | 11/2016 | Yukawa | B60C 19/002 |
| 2017/0008354 A1 | 1/2017 | Sakamoto et al. | |

FOREIGN PATENT DOCUMENTS

| | | | | |
|---|---|---|---|---|
| JP | 2008-254339 | | 10/2008 | |
| JP | 2008-308089 | | 12/2008 | |
| JP | 2009034924 A | * | 2/2009 | |
| JP | 4281874 | | 6/2009 | |
| JP | 2009-292462 | | 12/2009 | |
| JP | 5267288 | | 8/2013 | |
| JP | 2015-107691 | | 6/2015 | |
| WO | WO 2005/012007 | | 2/2005 | |
| WO | WO 2006/013874 | | 2/2006 | |
| WO | WO 2015/111315 | | 7/2015 | |
| WO | WO-2015111315 A1 | * | 7/2015 | B60C 19/002 |
| WO | WO 2015/118707 | | 8/2015 | |

\* cited by examiner

PNEUMATIC TIRE

TECHNICAL FIELD

The present technology relates to a pneumatic tire, and particularly relates to a pneumatic tire that can promote heat dissipation from a band-like sound absorbing member, and improve high-speed durability, in conjunction with relieving stress occurring on the band-like sound absorbing member during ground contact, and improving the durability of the band-like sound absorbing member, by providing a cut on the band-like sound absorbing member adhered to an inner surface of the tire.

BACKGROUND ART

Cavernous resonance caused by the vibration of the air filled in a cavity portion of a tire is one cause of tire noise. Cavernous resonance is caused by a tread portion of a tire contacting a road surface during vehicle travel vibrating due to unevenness on the road surface, and the vibration is caused by air inside a cavity portion of a tire vibrating. The cavernous resonance has a frequency range where noise is generated, and reducing the noise level of the frequency range is important in order to reduce tire noise.

Attaching a sound absorbing member including a porous material such as a sponge or the like to an inner circumferential surface of a tread portion on a tire inner surface by an elastic fixed band has been proposed as a method of reducing noise due to the cavernous resonance phenomenon (for example, refer to Japanese Patent No. 4281874). However, in a case where securing the sound absorbing member is dependent on the elastic fixed band, problems occur where the elastic fixed band deforms during high speed travel.

In contrast thereto, a method of directly adhering and securing a band-like sound absorbing member to a tire inner surface has been proposed (for example, refer to Japanese Patent No. 5267288). However, in this case, the band-like sound absorbing member is directly applied to a tire inner surface, and therefore, problems occur where heat accumulation is generated on a tread portion, and high-speed durability deteriorates due to heat accumulation. Furthermore, in a case where the band-like sound absorbing member is directly applied on a tire inner surface, problems occur where the band-like sound absorbing member cannot follow tire deflection and therefore is damaged.

SUMMARY

The present technology provides a pneumatic tire that can promote heat dissipation from a band-like sound absorbing member, and improve high-speed durability, in conjunction with relieving stress occurring on the band-like sound absorbing member during ground contact, and improving the durability of the band-like sound absorbing member, by providing a cut on the band-like sound absorbing member adhered to an inner surface of the tire.

A pneumatic tire of the present technology includes: an annular-shaped tread portion extending in a tire circumferential direction; a pair of sidewall portions disposed on both sides of the tread portion; a pair of bead portions disposed on an inner side in a tire radial direction of the sidewall portions; a band-like sound absorbing member being adhered on an inner surface of the tread portion along the tire circumferential direction; and a mounting direction with regard to a vehicle being specified; where a plurality of cuts are formed on the band-like sound absorbing member mutually intersecting such that angles θ1, θ2 with regard to the tire width direction are within a range where 0°≤θ1≤90° or 0°≤θ2≤90°; the cuts are locally disposed in a region adjacent to an end portion on a vehicle inner side of the band-like sound absorbing member; and a width Wc of the placement region of the cuts is from 10% to 80% with regard to a width Ws of the band-like sound absorbing member.

In the present technology, the plurality of cuts are formed on the band-like sound absorbing member, and are configured to mutually intersect such that angles θ1, θ2 of the cuts with regard to the tire width direction are within a range where 0°≤θ1≤90° or 0°≤θ2≤90°, and therefore, the cuts of the band-like sound absorbing member can open and follow the deformation of a tire when the tire deflects during ground contact, relieve stress generated on the band-like sound absorbing member, and suppress damaging of the band-like sound absorbing member. Thereby, the durability of the band-like sound absorbing member can be improved. Furthermore, the heat dissipation area of the band-like sound absorbing member increases based on the cuts of the band-like sound absorbing member opening during ground contact, and therefore, heat dissipation from the band-like sound absorbing member can be promoted, and thus high-speed durability of the pneumatic tire can be improved.

However, in general, when a vehicle turns at high speed, a tire is in a high load and high strain condition, large deformation occurs on the band-like sound absorbing member, and the band-like sound absorbing member may rub with a rim or tire inner wall, and therefore, the band-like sound absorbing member being subdivided by the plurality of cuts causes the durability of the band-like sound absorbing member to deteriorate. In particular, with a low flat tire mounted to a high-power vehicle with a high load, damage is more likely to occur on an end portion on a vehicle outer side of a band-like sound absorbing member. Therefore, cuts are locally disposed in a region adjacent to an end portion on a vehicle inner side of the band-like sound absorbing member, and the cuts are not disposed on the end portion of the band-like sound absorbing member on the vehicle outer side, and thus, damage of the band-like sound absorbing member can be prevented. Note that a negative camber angle is largely set for a high-power vehicle with a high load, and therefore, by disposing the cuts in a region adjacent to the end portion on the vehicle inner side of the band-like sound absorbing member as described above, damage of the end portion of the band-like sound absorbing member on the vehicle outer side can be suppressed while maintaining a stress relieving effect and heat dissipating effect.

Furthermore, an interval t of the cuts is preferably from 5% to 90%, and more preferably from 15% to 30% with regard to a width Ws of the band-like sound absorbing member. Thereby, the cuts of the band-like sound absorbing member can open and follow deformation of the tire during a ground-contacting rolling motion in a condition with high tire deflection, relieve stress generated on the band-like sound absorbing member, and suppress damaging of the band-like sound absorbing member. As a result, the durability of the band-like sound absorbing member can be improved.

A depth d of the cuts is preferably from 20% to 80%, and more preferably from 30% to 60% with regard to a thickness D of the band-like sound absorbing member. Thereby, the cuts of the band-like sound absorbing member can open during ground contact, promote heat dissipation from the band-like sound absorbing member, and improve the high-speed durability of the pneumatic tire. Furthermore, damaging of the band-like sound absorbing member caused by a ground-contacting rolling motion in a condition with a high tire deflection can be effectively suppressed.

Chamfering is preferably performed on at least an end portion positioned on the vehicle outer side of the end portions of the band-like sound absorbing member in the width direction. Thereby, the durability of the band-like sound absorbing member can be even further improved.

The band-like sound absorbing member is preferably disposed such that a center thereof in the width direction is more on the vehicle inner side than the tire equator. An adhering position of the band-like sound absorbing member is attached to the vehicle inner side, and therefore, the band-like sound absorbing member can be avoided from contacting a rim or tire inner wall during high deflection, and thus the durability of the band-like sound absorbing member can be even further improved.

A volume of the band-like sound absorbing member is preferably from 10% to 30% with regard to the luminal volume of the tire. Thereby, a sound absorbing effect based on the band-like sound absorbing member can be even further achieved. An excellent noise reducing effect can be achieved by increasing the volume of the band-like sound absorbing member, and a favorable stress relieving effect and heating dissipating effect can be demonstrated even with a large band-like sound absorbing member. The luminal volume of the tire is a volume of a cavity portion formed between a tire and rim in a condition where the tire is mounted on a regular rim and inflated to a regular internal pressure. "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). However, when the tire is an original equipment tire, the volume of the space is calculated using a genuine wheel to which the tire is assembled. "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

The band-like sound absorbing member preferably has a missing portion in at least one section in the tire circumferential direction. Thereby, long-term resistance is possible against expansion due tire inflation and shear strain of an adhering surface caused by a ground-contacting rolling motion.

DETAILED DESCRIPTION

Figure 1:
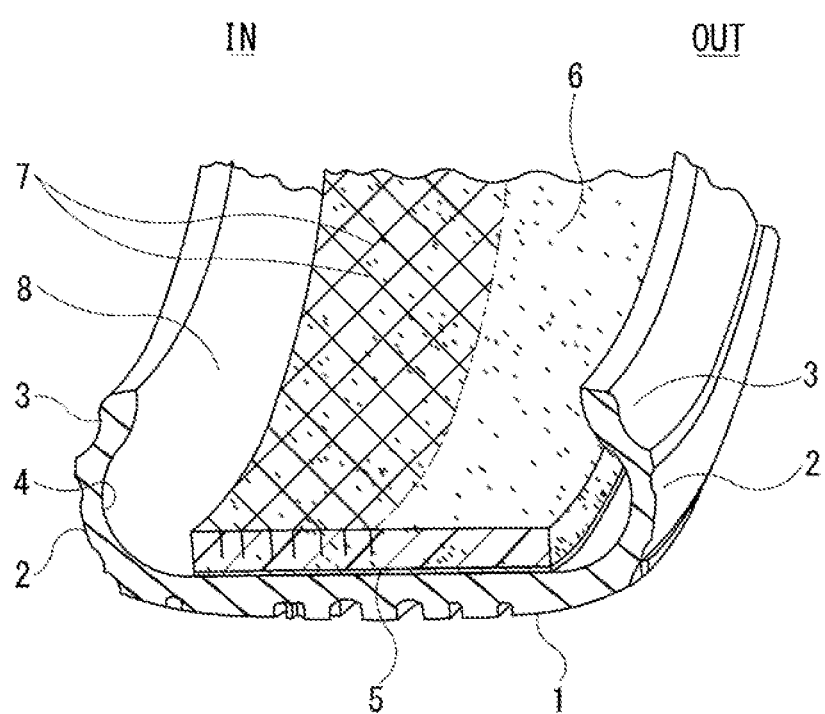
FIG. 1 is a perspective cross-sectional view of a pneumatic tire according to an embodiment of the present technology.
Figure 2:
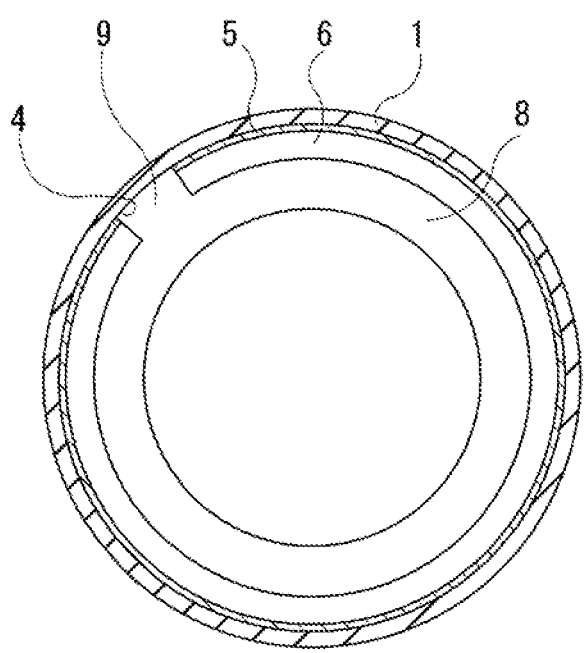
FIG. 2 is a cross-sectional view of an equator line illustrating a pneumatic tire according to an embodiment of the present technology.
Figure 3:
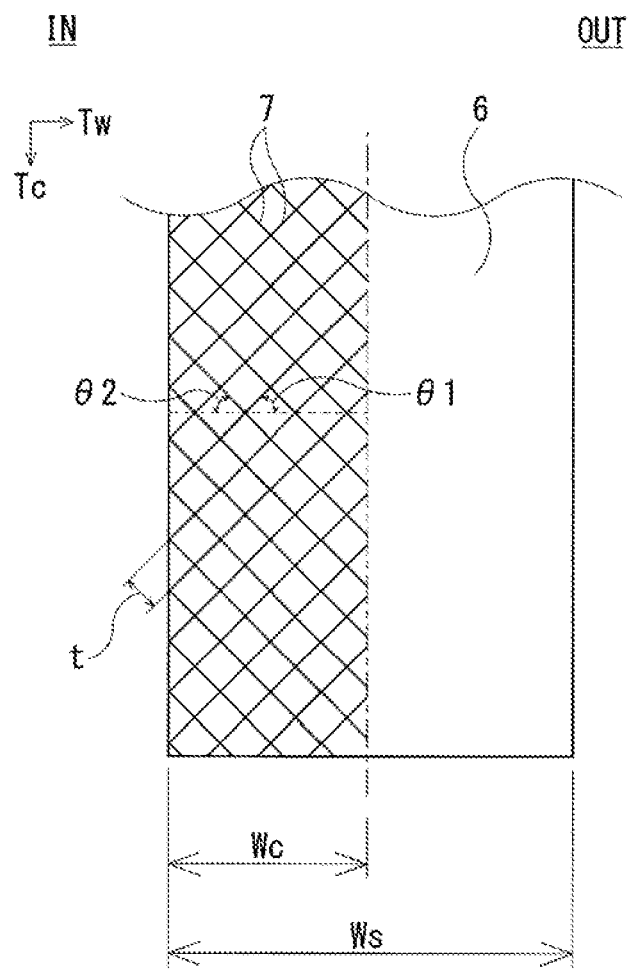
FIG. 3 is a developed view illustrating a portion of a band-like sound absorbing member adhered to an inner surface of a pneumatic tire of the present technology.
Figure 5:
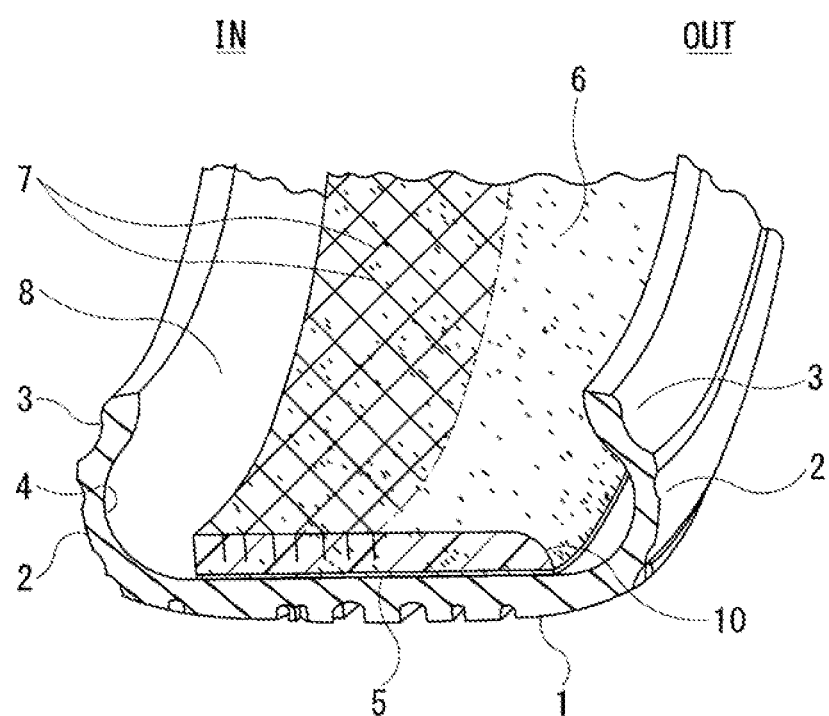
FIG. 5 is a perspective cross-sectional view illustrating a modified example of the pneumatic tire according to the present technology.

A configuration of the present technology will be described in detail below while referring to the attached drawings. FIG. 1 and FIG. 2 illustrate a pneumatic tire according to an embodiment of the present technology. In FIG. 1, FIG. 3, and FIG. 5, IN represents a vehicle inner side when mounted to a vehicle, and OUT represents a vehicle outer side when mounted to the vehicle.

As illustrated in FIG. 1, the pneumatic tire according to the present embodiment includes an annular-shaped tread portion 1 extending in a tire circumferential direction, a pair of sidewall portions 2 disposed on both sides of the tread portion 1, and a pair of bead portions 3 disposed on an inner side in a tire radial direction of the sidewall portions 2.

In the aforementioned pneumatic tire, a band-like sound absorbing member 6 is adhered via an adhesive layer 5 along the tire circumferential direction to a region of a tire inner surface 4 corresponding to the tread portion 1. The band-like sound absorbing member 6 is made of open-cell porous material and has predetermined noise absorbing properties based on the porous structure. Polyurethane foam may be used as the porous material of the band-like sound absorbing member 6. On the other hand, a double-sided adhesive tape is preferable as the adhesive layer 5.

A plurality of cuts 7 extending in two mutually intersecting directions are formed on the band-like sound absorbing member 6. Herein, as illustrated in FIG. 3, angles of the cuts 7 with regard to the tire width direction are angle $\theta 1$ and angle $\theta 2$. In FIG. 3, Tc represents the tire circumferential direction, and the Tw represents the tire width direction. At this time, the cuts 7 are disposed such that the angles $\theta 1, \theta 2$ with regard to the tire width direction of the cut 7 are within a range where $0° \leq \theta 1 \leq 90°$ or $0° \leq \theta 2 \leq 90°$.

Furthermore, the cuts 7 are locally disposed in a region adjacent to the end portion on the vehicle inner side of the band-like sound absorbing member 6. In other words, a region in the band-like sound absorbing member 6 from the end portion on the vehicle inner side of the band-like sound absorbing member 6 to a dashed-dotted line in FIG. 3 indicates a placement region of the cuts 7. A width of the placement region of the cuts 7 is set as a width Wc, and a width of the band-like sound absorbing member 6 is set as a width Ws. At this time, a condition is satisfied where the width Wc of the placement region of the cuts 7 is from 10% to 80% with regard to the width Ws of the band-like sound absorbing member 6.

In the aforementioned pneumatic tire, angles $\theta 1, \theta 2$ of the cuts 7 with regard to the tire width direction are both preferably within a range of 30° to 60°. Furthermore, the width Wc of the placement region of the cuts 7 is preferably from 30% to 60% with regard to the width Ws of the band-like sound absorbing member 6. Thereby, the cuts 7 of the band-like sound absorbing member 6 can open and follow deformation of the tire when the tire deflects during ground contact, relieve stress generated on the band-like sound absorbing member 6, and suppress damaging of the band-like sound absorbing member 6. As a result, the durability of the band-like sound absorbing member 6 can be improved. Furthermore, the heat dissipation area of the band-like sound absorbing member 6 increases based on the cuts 7 of the band-like sound absorbing member 6 opening during ground contact, and therefore, heat dissipation from the band-like sound absorbing member 6 can be promoted, and thus high-speed durability of the pneumatic tire can be improved.

As illustrated in FIG. 3, an interval between the cuts 7 is set as interval t. At this time, the interval t of the cuts 7 is preferably from 5% to 90%, and more preferably from 15% to 30% with regard to a width Ws of the band-like sound absorbing member 6. "Interval t" as referred to herein is an interval between cuts 7 extending in the same direction. Furthermore, the interval of the cuts 7 on the band-like sound absorbing member 6 may be randomly disposed, but the cuts 7 are more preferably disposed at equal intervals with constant intervals t of the cuts 7 on the band-like sound absorbing member 6, from the perspective of being able to uniformly correspond tensile strain in each direction. Thereby, the cuts 7 of the band-like sound absorbing member 6 can open and follow deformation of the tire during a ground-contacting rolling motion in a condition with high tire deflection, relieve stress generated on the band-like sound absorbing member 6, and suppress damaging of the band-like sound absorbing member 6. As a result, the durability of the band-like sound absorbing member 6 can be improved.

Figure 4:
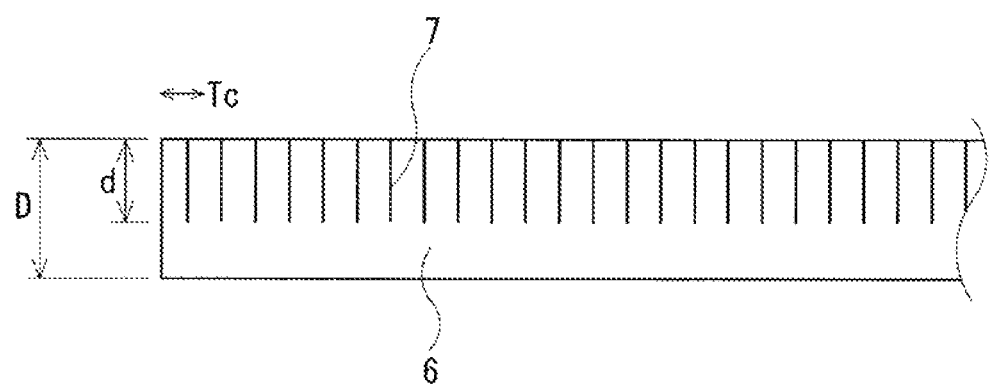
FIG. 4 is a cross-sectional view in a tire circumferential direction of the sound absorbing member in FIG. 3.

FIG. 4 is a cross-sectional view in the tire circumferential direction of the band-like sound absorbing member 6. A depth of the cuts 7 is set as a depth d, and a thickness of the band-like sound absorbing member 6 is set as a thickness D. At this time, a depth d of the cuts 7 is preferably from 20% to 80%, and more preferably from 30% to 60% with regard to a thickness D of the band-like sound absorbing member 6. Thereby, the cuts 7 of the band-like sound absorbing member 6 can open during ground contact, promote heat dissipation from the band-like sound absorbing member 6, and improve the high-speed durability of the pneumatic tire. Furthermore, damaging of the band-like sound absorbing member 6 caused by a ground-contacting rolling motion in a condition with a high tire deflection can be effectively suppressed. Herein, when the depth d of the cuts 7 is too shallow, heat dissipation from the band-like sound absorbing member 6 is reduced, and thus high-speed durability of the tire deteriorates. On the other hand, when a depth d of the cuts 7 is too deep, the band-like sound absorbing member 6 is more likely to be damaged, and wearing between the blocks of the band-like sound absorbing member 6 demarcated by the cuts 7 occurs.

As illustrated in FIG. 5, chamfering can be performed on an end portion of the band-like sound absorbing member 6 in the width direction. In FIG. 5, a chamfered portion 10 is formed along the tire circumferential direction on only an end portion positioned on the vehicle outer side of the end portions of the band-like sound absorbing member in the width direction. Therefore, chamfering is preferably performed on at least the end portion positioned on the vehicle outer side of the end portions of the band-like sound absorbing member 6 in the width direction. Thereby, the durability of the band-like sound absorbing member 6 can be even further improved.

In the aforementioned pneumatic tire, the band-like sound absorbing member 6 is preferably disposed such that a center thereof in the width direction is more on the vehicle inner side than the tire equator. An adhering position of the band-like sound absorbing member 6 is biased toward the vehicle inner side, and therefore, the band-like sound absorbing member 6 can be avoided from contacting a rim or tire inner wall during high deflection, and thus the durability of the band-like sound absorbing member 6 can be even further improved.

In the aforementioned pneumatic tire, a volume of the band-like sound absorbing member 6 is preferably from 10% to 30% with regard to the luminal volume of a tire. Furthermore, the width Ws of the band-like sound absorbing member 6 is more preferably from 30% to 90% with regard to a tire ground contact width. Thereby, a sound absorbing effect based on the band-like sound absorbing member 6 can be even further achieved. Herein, when the volume of the band-like sound absorbing member 6 is less than 10% with regard to the luminal volume of the tire, a sound absorbing effect cannot be appropriately achieved. Furthermore, when the volume of the band-like sound absorbing member 6 exceeds 30% with regard to the luminal volume of the tire, the noise reducing effect due to the cavernous resonance phenomenon will be constant, and a further reducing effect cannot be expected.

Furthermore, as illustrated in FIG. 2, the band-like sound absorbing member 6 preferably has a missing portion 9 in at least one section in the tire circumferential direction. The missing portion 9 is a portion where the band-like sound absorbing member 6 is not present on a tire circumference. By providing the missing portion 9 on the band-like sound absorbing member 6, long-term resistance is possible against expansion due to tire inflation and shear strain of an adhering surface caused by a ground-containing rolling motion, and shear strain generated on the adhering surface of the band-like sound absorbing member 6 can be effectively relieved. The missing portion 9 is preferably provided at one or 3 to 5 sections on the tire circumference. In other words, when the missing portion 9 is provided on two sections on the tire circumference, tire uniformity significantly deteriorates due to mass unbalance, and when the missing portion 9 is provided on 6 sections or more, manufacturing cost significantly increases.

Note that in a case where the missing portion 9 is provided on two or more sections on the tire circumference, the band-like sound absorbing member 6 is interrupted in the tire circumferential direction. However, even in this case, for example, in a case where a plurality of the band-like sound absorbing members 6 are mutually connected by another laminate such as an adhesive layer 5 formed from a double-side adhesive tape, the band-like sound absorbing members 6 can be handled as an integral member, and therefore, the work of applying to the tire inner surface 4 can be easily performed.

The present technology is further described below by examples, but the scope of the present technology is not limited to these examples.

EXAMPLES

Tires of Examples 1 to 16 in which a plurality of cuts are formed so as to mutually intersect with angles $\theta 1$, $\theta 2$ of 45° with regard to a tire width direction on a band-like sound absorbing member, and the cuts are locally disposed in a region adjacent to an end portion in a vehicle inner side of the band-like sound absorbing member, were prepared for a pneumatic tire having a tire size of 275/35ZR20 provided with an annular-shaped tread portion extending in a tire circumferential direction, a pair of sidewall portions disposed on both sides of the tread portion, and a pair of bead portions disposed on an inner side in a tire radial direction of the sidewall portions, where a band-like sound absorbing member is adhered on an inner surface of the tread portion along the tire circumferential direction, and a mounting direction with regard to a vehicle is specified.

In Examples 1 to 16, the presence or absence of the cuts (vehicle outer side, vehicle inner side), placement region of the cuts (width We/width Ws×100%), interval of the cuts (interval t/width Ws×100%), depth of the cuts (depth d/thickness D×100%), and presence or absence of chamfering on an end portion of the band-like sound absorbing member in the width direction are set as shown in Table 1.

For comparison, tires of conventional examples were prepared without providing any cuts in the band-like sound absorbing member. Furthermore, other than the cuts being disposed in the entire region of the band-like sound absorbing member, a tire of Comparative Example 1 having the same configuration as Example 1 was prepared; and other than the cuts being locally disposed in a region adjacent to an end portion on the vehicle outer side of the band-like sound absorbing member, a tire of Comparative Example 2 having the same configuration as Example 1 was prepared. Furthermore, other than the placement regions of the cuts were set as shown in Table 1-1, tires of Comparative Example 3 and Comparative Example 4 having the same configuration as Example 1 were prepared.

For the test tires, the high-speed durability with a camber angle, durability of the band-like sound absorbing member during high deflection, durability of the band-like sound absorbing member at a low temperature (−20° C.), tearing of the blocks due to rubbing of the band-like sound absorbing members, and wearing of the blocks due to rubbing of the band-like sound absorbing member were evaluated by the following test methods, and the results thereof are collectively shown in Table 1.

High-Speed Durability with Camber Angle:

The test tires were assembled on wheels having a rim size of 20×9 ½J, and then subjected to a traveling test on a drum testing machine under testing conditions where the air pressure was 360 kPa, the load was 5 kN, and the camber angle was −4°. Specifically, an initial speed was 250 km/h, the speed was increased by 10 km/h every 20 minutes, and the tire was run until failure occurred, and the reached step (speed) was measured. The results are shown in Table 1.

Durability of Band-Like Sound Absorbing Member During High Strain:

The test tires were assembled on wheels having a rim size of 20×9 ½J, and subjected traveling test on a drum testing machine under testing conditions where the traveling speed was 80 km/h, the air pressure was 160 kPa, the load was 8.5 kN, and the traveling distance was 3000 km, and then peeling of the adhering surface on the band-like sound absorbing member or presence/absence of damage on the band-like sound absorbing member was visually observed. The results are shown in Table 1. For the aforementioned items, cases where no dropout or damage occurred were denoted with "Excellent"; cases where peeling of the adhering surface or damaging of the band-like sound absorbing member occurred in a portion but was not problem were denoted with "Good"; cases where peeling of the adhering surface or damaging of the band-like sound absorbing member occurred on ¼ or less of the entire band-like sound absorbing member were denoted with "Fair"; and cases where peeling of the adhering surface or damaging of the band-like sound absorbing member occurred on ¼ or more of the entire band-like sound absorbing member were denoted with "Poor".

Durability at a Low Temperature (−20° C.):

The test tires were assembled on wheels having a rim size of 20×9 ½J, and subjected traveling test on a drum testing machine under testing conditions where the traveling speed was 80 km/h, the air pressure was 160 kPa, the load was 5 kN, and the traveling distance was 3000 km, and then peeling of the adhering surface on the band-like sound absorbing member or presence/absence of damage on the band-like sound absorbing member was visually observed. The results are shown in Table 1. For the aforementioned items, cases where no dropout or damage occurred were denoted with "Excellent"; cases where peeling of the adhering surface or damaging of the band-like sound absorbing member occurred in a portion but was not problem were denoted with "Good"; cases where peeling of the adhering surface or damaging of the band-like sound absorbing member occurred on ¼ or less of the entire band-like sound absorbing member were denoted with "Fair"; and cases where peeling of the adhering surface or damaging of the band-like sound absorbing member occurred on ¼ or more of the entire band-like sound absorbing member were denoted with "Poor".

Durability During J Turn Test:

The test tires were mounted to a wheel with a 20×9 ½ J rim size, filled at an air pressure of 180 kPa, mounted to a European car with an engine displacement of 3.5 L, run on a flat asphalt road surface in a straight line at a speed of 60 km/h, and then 10 turns of a stop test turning at a turning radius of 20 m were performed, the presence or absence of peeling on an adhering surface of the band-like sound absorbing member or damage on the band-like sound absorbing member was visually confirmed. The results are shown in Table 1. For the aforementioned items, cases where no dropout or damage occurred were denoted with "Excellent"; cases where peeling of the adhering surface or damaging of the band-like sound absorbing member occurred in a portion but was not problem were denoted with "Good"; cases where peeling of the adhering surface or damaging of the band-like sound absorbing member occurred on ¼ or less of the entire band-like sound absorbing member were denoted with "Fair"; and cases where peeling of the adhering surface or damaging of the band-like sound absorbing member occurred on ¼ or more of the entire band-like sound absorbing member were denoted with "Poor".

Tearing of Block Due to Rubbing Between Band-Like Sound Absorbing Members:

The test tires were assembled on wheels having a rim size of 20×9 ½J, and then subjected to a traveling test on a drum testing machine under testing conditions where the air pressure was 360 kPa, the load was 5 kN, and the camber angle was −4°. Specifically, the initial speed was set to 250 km/h, the speed was increased by 10 km/h every 20 minutes, and the tires were run until a speed of 310 km/h was achieved, and then tearing of the blocks due to band-like sound absorbing members rubbing together was visually confirmed. The results are shown in Table 1. For the aforementioned items, cases where no tearing of the blocks due to the band-like sound absorbing members together occurred were denoted with "Excellent"; cases where tearing of the blocks of the band-like sound absorbing member occurred in a portion but was not problem were denoted with "Good"; and cases where tearing of the blocks of the band-like sound absorbing member occurred on ¼ or less of the entire band-like sound absorbing member were denoted with "Fair".

Wearing of Block Due to Rubbing Between Band-Like Sound Absorbing Members:

The test tires were assembled on wheels having a rim size of 20×9 ½J, and then subjected to a traveling test on a drum testing machine under testing conditions where the air pressure was 360 kPa, the load was 5 kN, and the camber angle was −4°. Specifically, the initial speed was set to 250 km/h, the speed was increased by 10 km/h every 20 minutes, and the tires were run until a speed of 310 km/h was achieved, and then wearing of the blocks due to band-like sound absorbing members rubbing together was visually confirmed. The results are shown in Table 1. For the aforementioned items, cases where no wearing of the blocks due to the band-like sound absorbing members together occurred were denoted with "Excellent"; cases where wearing of the blocks of the band-like sound absorbing member occurred in a portion but was not problem were denoted with "Good"; and cases where wearing of the blocks of the band-like sound absorbing member occurred on ¼ or less of the entire band-like sound absorbing member were denoted with "Fair".

TABLE 1

| | | Conventional example | Comparative Example 1 | Comparative Example 2 | Comparative Example 3 | Comparative Example 4 |
|---|---|---|---|---|---|---|
| Presence/absence of cuts | Vehicle outer side | Absence | Presence | Presence | Absence | Absence |
| | Vehicle inner side | Absence | Presence | Absence | Presence | Presence |
| Placement region of cuts (Width Wc/width Ws × 100%) | | — | 100% | 40% | 5% | 85% |
| Interval of cuts (Interval t/width Ws × 100%) | | — | 4% | 4% | 4% | 4% |
| Depth of cuts (Depth d/thickness D × 100%) | | — | 10% | 10% | 10% | 10% |
| Presence/absence of chamfering on end portion in width direction of band-like sound absorbing member | | — | Absence | Absence | Absence | Absence |
| High-speed durability with camber angle (reached speed: km/h) | | 310 | 350 | 310 | 320 | 350 |
| Durability of band-like sound absorbing member | During high strain | Poor | Good | Fair | Fair | Good |
| | At low temperature (−20° C.) | Poor | Good | Fair | Fair | Good |
| | During J turn test | Good | Poor | Poor | Good | Fair |
| Tearing of block due to rubbing between band-like sound absorbing members | | — | Fair | Fair | Fair | Fair |
| Wearing of block due to rubbing between band-like sound absorbing members | | — | Good | Good | Good | Good |

| | | Example 1 | Example 2 | Example 3 | Example 4 | Example 5 | Example 6 |
|---|---|---|---|---|---|---|---|
| Presence/absence of cuts | Vehicle outer side | Absence | Absence | Absence | Absence | Absence | Absence |
| | Vehicle inner side | Presence | Presence | Presence | Presence | Presence | Presence |
| Placement region of cuts (Width Wc/width Ws × 100%) | | 40% | 40% | 40% | 40% | 40% | 40% |
| Interval of cuts (Interval t/width Ws × 100%) | | 4% | 5% | 15% | 30% | 45% | 60% |
| Depth of cuts (Depth d/thickness D × 100%) | | 10% | 10% | 10% | 10% | 10% | 10% |
| Presence/absence of chamfering on end portion in width direction of band-like sound absorbing member | | Absence | Absence | Absence | Absence | Absence | Absence |
| High-speed durability with camber angle (reached speed: km/h) | | 350 | 350 | 350 | 350 | 340 | 340 |
| Durability of band-like sound absorbing member | During high strain | Good | Excellent | Excellent | Excellent | Excellent | Excellent |
| | At low temperature (−20° C.) | Good | Good | Excellent | Excellent | Good | Good |
| | During J turn test | Good | Good | Good | Good | Good | Good |
| Tearing of block due to rubbing between band-like sound absorbing members | | Fair | Good | Excellent | Excellent | Excellent | Excellent |
| Wearing of block due to rubbing between band-like sound absorbing members | | Good | Good | Good | Good | Excellent | Excellent |

| | | Example 7 | Example 8 | Example 9 | Example 10 | Example 11 |
|---|---|---|---|---|---|---|
| Presence/absence of cuts | Vehicle outer side | Absence | Absence | Absence | Absence | Absence |
| | Vehicle inner side | Presence | Presence | Presence | Presence | Presence |
| Placement region of cuts (Width Wc/width Ws × 100%) | | 40% | 40% | 40% | 40% | 40% |
| Interval of cuts (Interval t/width Ws × 100%) | | 90% | 95% | 45% | 45% | 45% |
| Depth of cuts (Depth d/thickness D × 100%) | | 10% | 10% | 20% | 30% | 50% |
| Presence/absence of chamfering on end portion in width direction of band-like sound absorbing member | | Absence | Absence | Absence | Absence | Absence |

TABLE 1-continued

|  |  | Example 7 | Example 8 | Example 9 | Example 10 | Example 11 |
|---|---|---|---|---|---|---|
| High-speed durability with camber angle (reached speed: km/h) | | 340 | 330 | 340 | 350 | 350 |
| Durability of band-like sound absorbing member | During high strain | Excellent | Good | Good | Excellent | Excellent |
| | At low temperature (−20° C.) | Good | Good | Good | Excellent | Excellent |
| | During J turn test | Good | Good | Good | Good | Good |
| Tearing of block due to rubbing between band-like sound absorbing members | | Excellent | Excellent | Excellent | Excellent | Excellent |
| Wearing of block due to rubbing between band-like sound absorbing members | | Excellent | Excellent | Excellent | Excellent | Excellent |

|  |  | Example 12 | Example 13 | Example 14 | Example 15 | Example 16 |
|---|---|---|---|---|---|---|
| Presence/absence of cuts | Vehicle outer side | Absence | Absence | Absence | Absence | Absence |
| | Vehicle inner side | Presence | Presence | Presence | Presence | Presence |
| Placement region of cuts (Width Wc/width Ws × 100%) | | 40% | 40% | 40% | 40% | 40% |
| Interval of cuts (Interval t/width Ws × 100%) | | 45% | 45% | 45% | 45% | 45% |
| Depth of cuts (Depth d/thickness D × 100%) | | 60% | 80% | 90% | 20% | 20% |
| Presence/absence of chamfering on end portion in width direction of band-like sound absorbing member | | Absence | Absence | Absence | Presence (Outer side) | Presence (Inner side) |
| High-speed durability with camber angle (reached speed: km/h) | | 350 | 350 | 350 | 340 | 340 |
| Durability of band-like sound absorbing member | During high strain | Excellent | Excellent | Good | Good | Good |
| | At low temperature (−20° C.) | Excellent | Good | Good | Good | Good |
| | During J turn test | Good | Good | Good | Excellent | Good |
| Tearing of block due to rubbing between band-like sound absorbing members | | Good | Good | Good | Excellent | Excellent |
| Wearing of block due to rubbing between band-like sound absorbing members | | Good | Good | Fair | Excellent | Excellent |

As seen from Table 1, the pneumatic tires of Examples 1 to 16 all simultaneously had improved high-speed durability with a camber angle, durability of various band-like sound absorbing members, tearing of the blocks due to the band-like sound absorbing members rubbing together, and wearing of the blocks due to the band-like sound absorbing members rubbing together, as compared to the Conventional Example. On the other hand, in Comparative Examples 1 to 4, the cuts of the band-like sound absorbing member are not appropriately formed, and therefore, the improving effect is reduced as compared to the Examples 1 to 16.

The invention claimed is:

1. A pneumatic tire, comprising:
an annular-shaped tread portion extending in a tire circumferential direction;
a pair of sidewall portions disposed on both sides of the tread portion;
a pair of bead portions disposed on an inner side in a tire radial direction of the sidewall portions;
a band-like sound absorbing member being adhered on an inner surface of the tread portion along the tire circumferential direction; and
a mounting direction with regard to a vehicle being specified; wherein
a plurality of cuts are formed on the band-like sound absorbing member mutually intersecting such that angles $\theta 1$, $\theta 2$ with regard to the tire width direction are within a range where $0° \leq \theta 1 \leq 90°$ or $0° \leq \theta 2 \leq 90°$;
the cuts are locally disposed in a region adjacent to an end portion on a vehicle inner side of the band-like sound absorbing member;
a width Wc of the placement region of the cuts is from 10% to 80% with regard to a width Ws of the band-like sound absorbing member; and
the cuts extend continuously from the end portion across the width Wc.

2. The pneumatic tire according to claim 1, wherein an interval t of the cuts is from 5% to 90% with regard to the width Ws of the band-like sound absorbing member.

3. The pneumatic tire according to claim 2, wherein a depth d of the cuts is from 20% to 80% with regard to a thickness D of the band-like sound absorbing member.

4. The pneumatic tire according to claim 3, wherein chamfering is performed on at least an end portion positioned on a vehicle outer side of end portions in the width direction of the band-like sound absorbing member.

5. The pneumatic tire according to claim 4, wherein the band-like sound absorbing member is disposed such that a center in the width direction thereof is more on the vehicle inner side than a tire equator.

6. The pneumatic tire according to claim 5, wherein a volume of the band-like sound absorbing member is from 10% to 30% with regard to a luminal volume of the tire.

7. The pneumatic tire according to claim 6, wherein the band-like sound absorbing member has a missing portion in at least one section in the tire circumferential direction.

8. The pneumatic tire according to claim 1, wherein a depth d of the cuts is from 20% to 80% with regard to a thickness D of the band-like sound absorbing member.

9. The pneumatic tire according to claim 1, wherein chamfering is performed on at least an end portion positioned on a vehicle outer side of end portions in the width direction of the band-like sound absorbing member.

10. The pneumatic tire according to claim 1, wherein the band-like sound absorbing member is disposed such that a center in the width direction thereof is more on the vehicle inner side than a tire equator.

11. The pneumatic tire according to claim 1, wherein a volume of the band-like sound absorbing member is from 10% to 30% with regard to a luminal volume of the tire.

12. The pneumatic tire according to claim 1, wherein the band-like sound absorbing member has a missing portion in at least one section in the tire circumferential direction.

* * * * *